F. M. CHAMPLIN.
RATE OF ASCENT INDICATOR FOR AEROPLANES.
APPLICATION FILED JAN. 13, 1917.
1,338,358.
Patented Apr. 27, 1920.
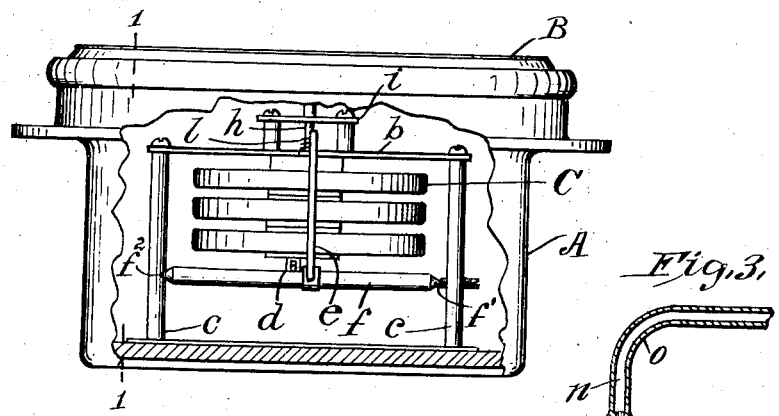
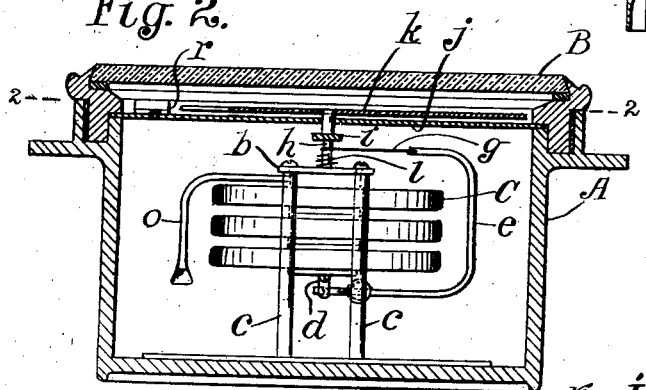
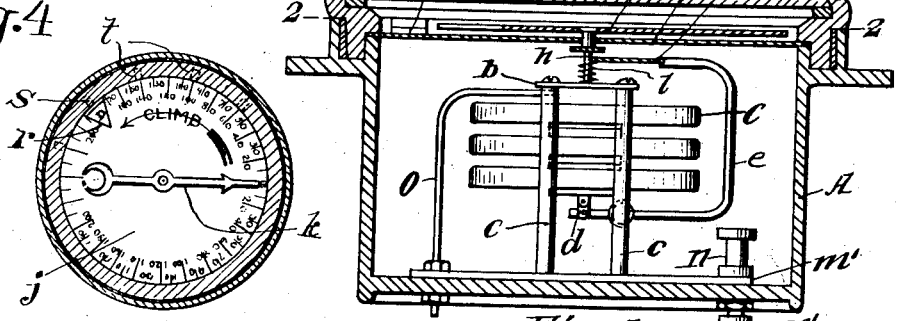
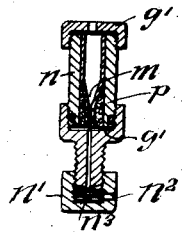
Inventor
FRANCIS M. CHAMPLIN.
By his Attorney
Herbert H. Thompson

UNITED STATES PATENT OFFICE.

FRANCIS M. CHAMPLIN, OF BROOKLYN, NEW YORK, ASSIGNOR TO SPERRY GYROSCOPE COMPANY, OF BROOKLYN, NEW YORK, A CORPORATION OF NEW YORK.

RATE-OF-ASCENT INDICATOR FOR AEROPLANES.

1,338,358. Specification of Letters Patent. Patented Apr. 27, 1920.

Application filed January 13, 1917. Serial No. 142,139.

*To all whom it may concern:*

Be it known that I, FRANCIS M. CHAMPLIN, a citizen of the United States, residing at 102 Pierpont street, Brooklyn, in the county of Kings and State of New York, have invented certain new and useful Improvements in Rate-of-Ascent Indicators for Aeroplanes, of which the following is a specification.

This invention relates to an instrument for indicating the rate of change of atmospheric pressure and will be hereinafter termed an indicator. It can be used wherever the rate of change of atmospheric or fluid pressure is required, but is especially applicable to all manner of air-crafts and when applied thereto affords a means of denoting the rate of ascent or descent, and of indicating when the machine is climbing or descending faster than safety permits.

The mechanism of my device may be somewhat similar to the ordinary aneroid barometer having, however, a specially constructed elastic container connected by mechanism to an indicating hand or needle. The graduations and characters used upon the dial are essentially different from those of a barometer being peculiar to my device.

The invention will be understood by reference to the annexed drawing, in which Figure 1 is a side elevation of my indicator with part of the outer casing removed; Fig. 2 is a vertical cross section taken on line 1—1 in Fig. 1, with certain parts removed; Fig. 3 is an enlarged cross section of one of its parts; Fig. 4 is a cross section on line 2—2 in Fig. 2, but on a reduced scale. Fig. 5 is a modification and Fig. 6 is a detail thereof.

A is a casing as commonly used in an aneroid barometer, being open to the atmosphere and having a transparent cover B secured thereto in any suitable manner.

An elastic container C having a yielding wall is hung on a cross-piece $b$ supported by and fastened to posts $c$ which in turn are rigidly secured to the bottom of the casing. The under side of the container is provided with a link $d$ which is movably connected to one end of a rocking-arm $e$, said arm being rigidly secured to a rock-shaft $f$ which is held movably in bearings $f'$ and $f^2$.

The opposite end of the rocking-arm is provided with a cord $g$, one end of which is secured at a point on an indicator-spindle $h$.

Said spindle is mounted on the cross-piece and is guided by a bearing in plate $i$. One end of the spindle projects above a graduated dial $j$ and is provided with an indicator or needle $k$ affixed to such projecting end. The needle is thereby moved over the face of the dial as the spindle is rotated.

A hair-spring $l$ is applied to the spindle to hold the same in position and the cord taut, thus retaining the needle normally in one position as at zero.

As a danger signal, I provide the dial-face with a distinctive character in such position on the dial as to warn the operator that the rate of change of altitude, or the rate of climb, is too fast for safety when the needle has reached such character. Since the danger rate of climb varies according to the kind of aircraft used, depending upon the type of aeroplane and the power of the motor, the character or signal may therefore be made adjustable upon the dial in any suitable manner.

In the drawing, I have shown a plate $r$ having a shank $s$ to fit any of a series of holes $t$. The danger point may thus be varied as required, by shifting the plate to the desired location on the dial.

In my device I make the container in one form similar to that used in the aneroid barometer, except for a very small opening of predetermined size, as an air communication between the interior of the container and the atmosphere. Such opening may be furnished by attaching a tube $o$ to the container having a small opening or orifice $m$ therethrough. A capillary tube having the end drawn out to reduce the size of the opening may be used if desired.

When the atmospheric pressure on the indicator is uniform, the pressure within the container and the atmospheric pressure are equal, owing to the capillary through which air may pass and the needle will read zero no matter what the actual pressure is at that time.

When, however, the atmospheric pressure increases or decreases the difference in pressure between that within the container and that of the atmosphere tends to be equalized by a flow of air through the capillary.

On account of the resistance of the capillary, the flow of air is admitted to or ejected from the container very slowly and the pressures do not equalize immediately.

Such difference in pressure effects an expansion or contraction of the container in proportion to the decrease or increase of the atmospheric pressure.

An expansion of the container moves the link downwardly, actuating the rocking-arm to remove the tension from the cord, which permits the spring to rotate the spindle, thereby causing the needle to move over the face of the dial.

The faster the change of atmospheric pressure the greater will be the difference in pressure between the interior of the container and the atmosphere, since, as is well known, the flow of a fluid through a very small orifice is approximately directly proportional to the difference in pressure on the two sides of the orifice. It is therefore obvious that in such case there will be a greater distention of the diaphragm and consequently a greater movement of the needle or indicator.

Therefore, upon the slow ascent of the craft to which the indicator may be applied a reading of the scale will show the needle at a certain character denoting that the craft is ascending at the rate of (for instance) fifty feet per minute, or any rate of change of the altitude will be designated as slow.

During a speed ascent, a reading of the scale will show a greater movement of the needle, or pointing to a certain character denoting that the craft is ascending at the rate of (for instance) two hundred feet per minute, and any rate of change of altitude will be designated as fast, or if too fast the indicator-hand will point to the danger signal.

It will be readily understood that the above stated example of ascending is also applicable to the action of descending, in which case, however, the container will be contracted and operation of the working parts reversed. The preferred form of barometric instrument which I use in my invention is shown in Fig. 5, in which the tube O is lengthened so as to communicate with the atmosphere without the casing A, no capillary $m$ being employed in connection with the tube. In this form, the capillary is placed as shown at $m'$ and is the only means of air communication between the inside and outside of the casing. It will readily be seen then that a rapid change of pressure without the case will be followed by a slower change within the case while because of the large opening leading into the elastic container C, the pressure within said container will always equal the pressure without the case A. Thus the opposite sides of the walls of C may be subject to unequal pressures, and will yield to the greater pressure and communicate the yielding motion to the indicating needle. I find that in this form of my invention, the movements of the needle are many times greater than in the other form, and therefore much more accurate.

In order to protect the capillary member from injury, I may place it in a casing $n$ and surround it with any suitable packing $p$. And to prevent particles of dust from clogging the capillary opening I may provide a fine metal gauze or the like $g'$ across the opening in the casing $n$.

As shown in Fig. 6, I may provide a cap $n'$ over the orifice which leads into the case A. This cap has a small hole $n^2$ to allow the air to pass in and out. A small stopper $n^3$ is attached to the inside of the cap, which, when the cap is screwed on tightly, serves to completely close the orifice, so that the pressure in the case A will remain constant irrespective of outside atmospheric pressure.

By thus causing the pressure in A to remain constant, I may use the instrument as a barometer for measuring actual distances of ascent. This form of barometer differs from ordinary forms of aneroid barometers in that the atmospheric pressure is allowed to pass freely in and out of chamber C, while the pressure around said chamber remains constant.

The great value of a barometer of this form is that even with a smaller instrument, a much larger volume of air than in other forms of the invention is employed thereby decreasing the amount of probable error. The movements imparted to the yielding wall and transmitted to the indicating needle are also greatly increased, so that a great degree of accuracy may be obtained.

Another advantage in this form of barometer is, that when the indicating needle reaches its limit on the dial, the usual method of procedure is to shift the dial with respect to the needle and allow the needle to continue and to add the new reading to the old. In my invention I prefer to open the orifice by unscrewing the cap $n'$, thus allowing the pressure in the case A to become equal to the atmospheric pressure. The needle will then return to the starting point. The orifice may then be closed and the needle will begin to indicate variations anew. This new reading may be added to the old as in the previous case.

In accordance with the provisions of the patent statutes, I have herein described the principle of operations of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a container having a yielding wall subject to atmospheric pressure on one side, means for retarding the rate at which the pressure on the other side of said wall tends to become equal to a changing atmospheric pressure, and indicating means actuated by said wall in accordance with the rate of change of atmospheric pressure.

2. In a device for indicating the rate of change of altitude, a container having a yielding wall, said wall being subject to atmospheric pressure on one side, means for retarding the rate at which the pressure on the other side of said wall tends to become equal to a changing atmospheric pressure due to changes in altitude, a dial having a needle mounted movably thereon, and means to operate the needle actuated by the movements of the said wall due to the relative variations in pressure of air on either side of said wall.

3. In a device for indicating the rate of change of altitude, a container having a yielding wall, said wall being subject to atmospheric pressure on one side, means for retarding the rate at which the pressure on the other side of said wall tends to become equal to a changing atmospheric pressure due to changes in altitude, a graduated dial having a needle mounted movably thereon, an adjustable danger signal upon the dial and a rocking-arm carried on a rock-shaft to operate the needle and adapted to be actuated by the movements of the said wall due to the relative variations in pressure of air on either side of said wall.

4. In combination, a container having a yielding wall, and having an orifice connecting the interior of the container with the atmosphere, and an indicating means actuated by the movements of said wall in accordance with the relative pressures of air within and without the container.

5. In a device for indicating the rate of change of altitude, an elastic container having an orifice connecting the said container and the atmosphere whereby the air operates to vary the expansion and contraction of the container due to the relative pressures of air within and without the container.

6. In a barometric device, a container having a yielding wall, a tube, having one end reduced to form a capillary, connecting the interior of the container with the atmosphere, and an indicator actuated by the movement of the said wall due to the relative pressures of air within and without the container.

7. In a device for indicating the rate of change of altitude, a bellows-container having a yielding wall and having an orifice connecting the interior of the container with the atmosphere, and means actuated by the movements of said wall to indicate the rate of change of altitude due to the relative changes of air pressure within and without the container.

8. In combination, a container having a yielding wall, said wall being freely subject to outside fluid pressure on one side, means for retarding the rate at which the pressure on the other side of said wall becomes equal to the changing outside fluid pressure, and indicating means actuated by said wall in accordance with the rate of change of said outside fluid pressure.

9. In combination, a container, a second container having a yielding wall within said first container, the interior of one of said containers having free communication with the surrounding fluid and the other having means for retarding the rate of equalization of fluid pressure within and without the container and an indicating means actuated by the movements of the yielding wall due to the difference in pressure on opposite sides of said yielding wall, said indicating means including a scale.

10. In combination, a case having an orifice connecting its interior with the atmosphere, a container within said case having a yielding wall and having its interior in free communication with the atmosphere without the aforesaid case, and an indicating means actuated by the movements of said wall due to the relative pressures of air on the opposite sides of said wall, said indicating means comprising a scale.

11. In combination, a case having an orifice connecting its interior with the fluid without, a container within said case having a yielding wall and having its interior in free communication with the fluid without the aforesaid case, and an indicating means actuated by the movements of said wall due to the relative pressures of the fluid on the opposite sides of said wall, said indicating means comprising a scale.

12. In combination, a case having an orifice connecting its interior with the fluid without, means for protecting said orifice from dust, a container within said case having a yielding wall and having its interior in free communication with the fluid without the aforesaid case, and an indicating means actuated by the movements of said wall due to the relative pressures of the fluid on the opposite sides of said wall, said indicating means comprising a scale.

13. In combination, a container having a yielding wall, said wall being subject to atmospheric pressure on one side, means for retarding the rate at which the pressure on the other side of said wall becomes equal to the changing atmospheric pressure, indicating means actuated by the movements of said wall due to relative pressures of air on the opposite sides of said wall, and means for closing said retarding means.

14. In combination, a case having an orifice connecting its interior with the atmosphere, means for closing said orifice, a container within said case having a yielding wall and having its interior in free communication with the atmosphere without the aforesaid case, and an indicating means actuated by the movements of said wall due to the relative pressures of air on the opposite sides of said wall.

15. In combination, a container having a restricted vent, indicating means comprising a scale and means comprising a connection between said container and indicating means for causing a change in reading of the latter responsive to the rate of change in pressure of the medium surrounding said container.

16. An instrument for indicating the rate of vertical movement of aircraft, said instrument comprising a chamber having restricted communication with the atmosphere, movable means subjected to the pressure within said chamber and to the opposing pressure of the atmosphere and indicating means with which said movable means coöperates for indicating the rate of vertical movement.

17. An instrument for indicating vertical movement of aircraft, said instrument comprising a chamber having restricted communication with the atmosphere, a scale calibrated to read rate of vertical movement, movable indicating means coöperating with said scale and means for causing movement of said movable indicating means when the pressure within said chamber differs from that of the surrounding atmosphere.

In testimony whereof I have affixed my signature.

FRANCIS M. CHAMPLIN.